United States Patent
Hansen et al.

(10) Patent No.: US 12,479,057 B2
(45) Date of Patent: Nov. 25, 2025

(54) DEBRIS COLLECTION ASSEMBLY

(71) Applicant: THE BOEING COMPANY, Chicago, IL (US)

(72) Inventors: Jeffrey Michael Hansen, Moses Lake, WA (US); Brenda Brigette Nolan, Moses Lake, WA (US); Dallas Owen Thornton, Moses Lake, WA (US)

(73) Assignee: The Boeing Company, Arlington, VA (US)

( * ) Notice: Subject to any disclaimer, the term of this patent is extended or adjusted under 35 U.S.C. 154(b) by 515 days.

(21) Appl. No.: 18/146,064

(22) Filed: Dec. 23, 2022

(65) Prior Publication Data

US 2024/0207991 A1    Jun. 27, 2024

(51) Int. Cl.
*B23Q 11/00* (2006.01)
*B23B 25/00* (2006.01)

(52) U.S. Cl.
CPC ......... *B23Q 11/0046* (2013.01); *B23B 25/00* (2013.01); *B23B 2270/62* (2013.01)

(58) Field of Classification Search
CPC . B23Q 11/0046; B23Q 11/0071; B23B 25/00; B23B 25/02; B23B 2270/62; A47L 7/0095; Y10T 408/56245
USPC ...................................................... 15/300.1
See application file for complete search history.

(56) References Cited

U.S. PATENT DOCUMENTS 8,337,124 B2 * 12/2012 Nguyen ............. B23Q 11/1092
                                                 408/241 B
10,012,243 B2 * 7/2018 Li ........................ B25H 1/0057
2021/0039228 A1 * 2/2021 Stouffer ................. B25B 5/142

FOREIGN PATENT DOCUMENTS

DE   19757424 A1 *  6/1999  ............ B08B 1/34
KR  20080005289 U * 11/2008  ........... B23B 45/00
TW     M308804 U   *  4/2007

* cited by examiner

*Primary Examiner* — Monica S Carter
*Assistant Examiner* — Caleb Andrew Holizna
(74) *Attorney, Agent, or Firm* — Joseph M. Butscher; The Small Patent Law Group LLC

(57) ABSTRACT

A debris collection assembly includes a jig and an adapter insert. The jig includes a front wall and a back wall opposite the front wall. The front wall defines an aperture therethrough. The back wall defines an adapter opening that aligns with the aperture. The jig includes a vacuum port and defines an interior cavity that fluidly connects the aperture, the adapter opening, and the vacuum port. The adapter insert is removably loaded through the adapter opening into the interior cavity of the jig. The adapter insert defines an orifice sized to receive a drill bit and allow the drill bit to extend through the aperture in the front wall to drill into a work piece. Negative pressure at the vacuum port draws airflow through the interior cavity and captures debris generated from drilling.

20 Claims, 7 Drawing Sheets

DEBRIS COLLECTION ASSEMBLY

FIELD OF THE DISCLOSURE

Embodiments of the present disclosure generally relate to tools associated with drilling holes into work pieces.

BACKGROUND OF THE DISCLOSURE

Drilling into a work piece, such as a panel or post, typically generates debris in the form of shavings, chips, dust, powder, and/or the like. The debris is typically collected in a post-drilling cleaning operation. In some applications, it may be difficult to clean up all of the debris due to accessibility issues. In other applications, the drilling operation may occur in an environment that includes safety-critical and/or sensitive instruments, electronics, and/or equipment. The presence of debris, sometimes referred to as foreign object debris (FOD), in these areas could degrade or damage the instruments, electronics, and/or equipment. A mechanic drilling in a sensitive environment may mask the surrounding areas, which is time-consuming and not entirely effective at preventing the introduction of FOD. The mechanic may also construct a bag formed of tape and/or plastic, which surrounds the drill bit to catch the debris from the drilled hole. Like masking, constructing and installing the bag around the drill bit may be inefficiently time-consuming and/or ineffective.

SUMMARY OF THE DISCLOSURE

A need exists for tooling to effectively, efficiently, and reliably contain and collect debris during a drilling operation. The tooling would avoid or reduce post-drilling clean-up operations and substantially reduce the risk of damage and/or degradation caused by debris exposure to sensitive instruments, electronics, and/or equipment.

With those needs in mind, certain embodiments of the present disclosure provide a debris collection assembly that includes a jig and an adapter insert. The jig includes a front wall and a back wall opposite the front wall. The front wall defines an aperture therethrough, and the back wall defines an adapter opening that aligns with the aperture in the front wall. The jig includes a vacuum port configured to attach to a vacuum tube. The jig defines an interior cavity that fluidly connects the aperture, the adapter opening, and the vacuum port. The adapter insert is removably loaded through the adapter opening into the interior cavity. The adapter insert defines an orifice therethrough that is sized to receive a drill bit and allow the drill bit to extend through the aperture in the front wall to drill into a work piece. Negative pressure at the vacuum port draws airflow through the interior cavity and captures debris generated from drilling.

Certain embodiments of the present disclosure provide a method of drilling a work piece to collect debris. The method includes affixing a jig in place relative to a work piece. The jig includes a front wall and a back wall opposite the front wall. The front wall defines an aperture therethrough, and the back wall defines an adapter opening that aligns with the aperture in the front wall. The jig includes a vacuum port and defines an interior cavity that fluidly connects the aperture, the adapter opening, and the vacuum port. The method includes loading an adapter insert through the adapter opening into the interior cavity of the jig. The adapter insert defines an orifice therethrough that is sized to receive a drill bit. The method includes drawing airflow, via a vacuum coupled to the vacuum port of the jig, along an air pathway that extends from an air inlet of the jig through the interior cavity to the vacuum port, and drilling a hole in the work piece via a drill connected to the drill bit. The vacuum draws the airflow to capture debris generated from the drilling.

Certain embodiments of the present disclosure provide a debris collection assembly that includes a jig, a vacuum, and an adapter insert. The jig includes a front wall, a back wall, and at least a first side wall extending from the front wall to the back wall. The front wall defines an aperture therethrough. The first side wall includes a vacuum port configured to attach to a vacuum tube. The back wall defines an adapter opening that aligns with the aperture in the front wall. The jig defines an interior cavity that fluidly connects the aperture, the adapter opening, and the vacuum port. The vacuum is coupled to the vacuum port of the jig via a tube. The vacuum is configured to draw airflow along an air pathway that extends from an air inlet of the jig through the interior cavity to the vacuum port. The adapter insert is removably loaded through the adapter opening into the interior cavity of the jig. The adapter insert defines an orifice therethrough that is sized to receive a drill bit and allow the drill bit to extend through the aperture in the front wall to drill into a work piece. The vacuum draws the airflow to capture debris, generated from drilling, into the interior cavity of the jig and collect the debris in a receptacle of the vacuum.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a drilling tool assembly that captures and collects debris during a drilling operation to prohibit debris from entering the surrounding environment and interfering with instruments, electronics, wiring, and/or equipment. The tool assembly is referred to herein as a debris collection assembly. At least one benefit of the debris collection assembly described herein is improving the effectiveness and reliability of debris containment over known containment methods and devices, such as installing a bag that surrounds the drilling location. As a result, the debris collection assembly may significantly reduce the risk of damaging and/or degrading operation of nearby instruments, wiring, electronics, and/or equipment due to debris exposure. Another benefit of the greater effectiveness and reliability is that a post-drilling clean-up procedure may be substantially quick and easy and/or avoided completely because there is very limited, if any, debris that is not captured and collected by the debris collection assembly. A second benefit of the debris collection assembly described herein is greatly increasing the efficiency of a drilling operation, particularly a drilling operation in a sensitive environment. For example, a conventional drilling operation in a sensitive environment may take many hours, even multiple days, when considering the time spent masking the surrounding environment, constructing a bag to capture debris, drilling, and then cleaning up. Use of the debris collection assembly could reduce the man hours for the same drilling operation by over 50% or more. The debris collection assembly may also alleviate the physical difficulty of the drilling operation on a mechanic, which together with the increased efficiency can greatly improve the output of the mechanic.

Figure 1:
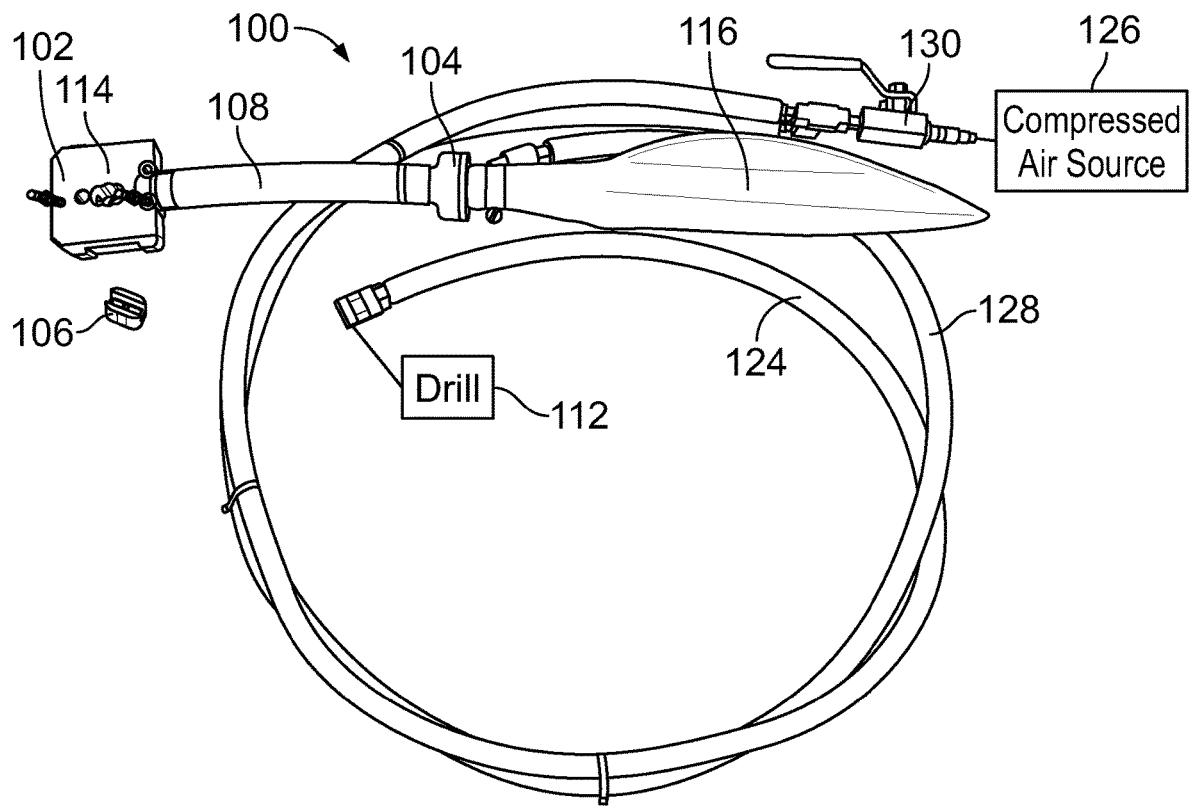
FIG. 1 illustrates a debris collection assembly according to an embodiment.

FIG. 1 illustrates a debris collection assembly 100 according to an embodiment. The debris collection assembly 100 includes at least a jig 102, a vacuum 104, and at least one adapter insert 106. The jig 102 is designed to affix to a work piece for drilling a hole into the work piece. The jig 102 mechanically and fluidly couples to the vacuum 104. For example, the jig 102 may be coupled to the vacuum 104 via a tube (e.g., vacuum tube) 108. The tube 108 may be a length of a flexible hose, a rigid hollow member, or the like. The tube 108 may be a portion of the vacuum 104 or a separate component that bridges a gap between the vacuum 104 to the jig 102. Each adapter insert 106 is discrete from the jig 102, as indicated by the spaced-apart location of the adapter insert 106 relative to the jig 102 in FIG. 1. Each adapter insert 106 is sized and shaped to be removably loaded into the jig 102, as shown in FIG. 2.

Figure 2:
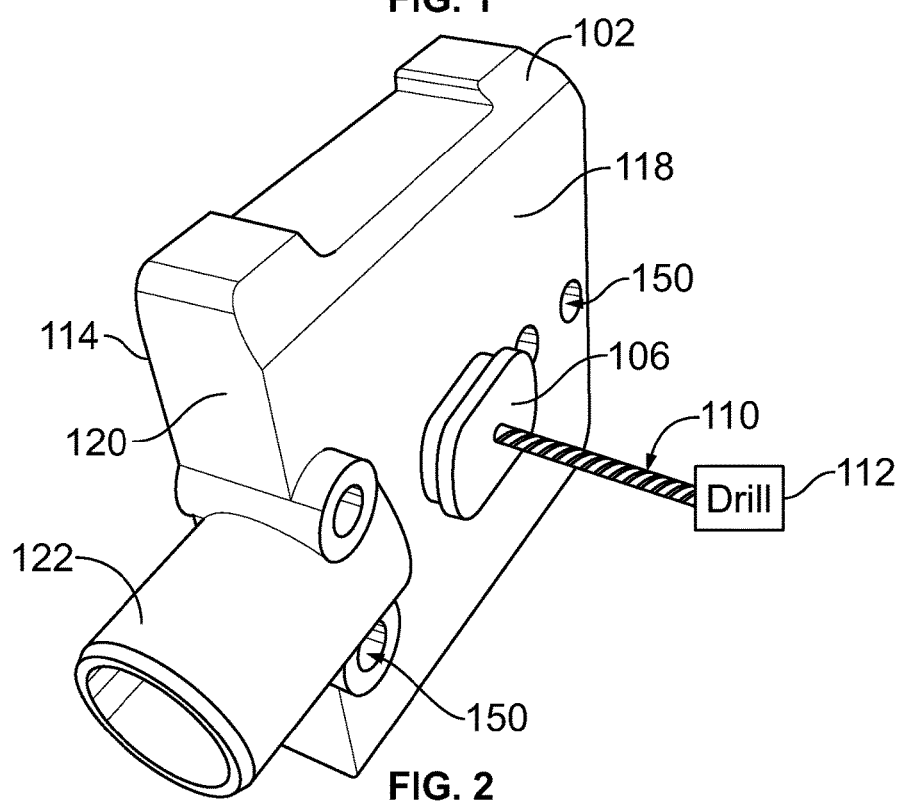
FIG. 2 illustrates an adapter insert loaded into a jig of the debris collection assembly according to an embodiment.

FIG. 2 illustrates an adapter insert 106 loaded into the jig 102 of the debris collection assembly 100 according to an embodiment. The following description refers to both FIGS. 1 and 2. The adapter insert 106 receives and guides a corresponding drill bit 110. For example, the adapter insert 106 may have an orifice or channel that is sized only slightly greater than a diameter of the drill bit 110 to limit lateral movement and tilt of the drill bit 110 relative to the adapter insert 106. The adapter insert 106 may hold the drill bit 110 perpendicular to the front wall 114 of the jig 102 to provide a perpendicular drilling angle. The debris collection assembly 100 may include multiple different adapter inserts 106. The different adapter inserts 106 may receive and guide different corresponding drill bits, such as different types and/or sizes of drill bits. Optionally, one or more of the adapter inserts 106 may receive and guide a drill attachment member that is not a drill bit, such as a wire brush.

The jig 102 includes a front wall 114, a back wall 118, and one or more side walls that extend from the front wall 114 to the back wall 118. The jig 102 includes a vacuum port 122 that couples to the vacuum tube 108. The vacuum port 122 may be a hollow, short pipe that projects from a first side wall 120 of the side walls. In a first alternative embodiment, the vacuum port 122 may be extend from the back wall 118 rather than the first side wall 120. In a second alternative embodiment, the vacuum port 122 may be simply an opening in the exterior surface of the jig 102 rather than a hollow projection, and a discrete fitting is used to couple the end of the vacuum tube 108 to the first side wall 120 at the opening.

To drill a hole in the work piece, a drill 112 is coupled to the drill bit 110 in the adapter insert 106. The jig 102 is oriented such that the front wall 114 faces or abuts against the work piece, and the jig 102 is disposed between the drill 112 and the work piece. As the drill 112 rotates the drill bit 110, a distal tip of the drill bit 110 protrudes beyond the front wall 114 to drill a hole in the work piece. As the drill bit 110 rotates, the vacuum 104 provides a negative pressure that draws airflow through an interior cavity of the jig 102. The stream of air may be relatively high velocity. The air stream within the interior cavity of the jig 102 flows along a distal segment of the adapter insert 106 and around a portion of the drill bit 110. The airflow sucks shavings, chips, dust, powder, and/or the like generated by the drilling (collectively referred to herein as debris) through the vacuum port 122 and into the vacuum 104. The debris that is captured in the jig 102 may be collected and contained in a receptacle 116 of the vacuum 104. The debris generated by the drilling operation is captured and contained before the debris can enter the surrounding environment and land on nearby wires, instruments, electronics, and/or equipment.

In an example, the drill 112 is a pneumatic drill that is powered by pressurized (e.g., compressed) air. The drill 112 may receive compressed air through a hose 124 that is connected to a compressed air source 126. The source 126 may be a tank or reservoir. In an example, the vacuum 104 may be pneumatic and powered by compressed air received through a second hose 128. For example, the vacuum 104 may be a venturi-style vacuum in which compressed air powers a turbine and/or venturi that creates a suction (e.g., negative pressure).

In an embodiment, the drill 112 and the vacuum 104 are both powered by the same compressed air source 126, such that the compressed air source 126 supplies compressed air to power both the vacuum 104 and the drill 112. In an example, the debris collection system 100 includes an air valve 130 that is connected to the compressed air source 126. The air valve 130 is also connected to each of the drill 112 and the vacuum 104 via the two hoses 124, 128, respectively. The air valve 130 may split a compressed air stream from the source 126 into each of the hoses 124, 128. The air valve 130 may assure that the vacuum 104 and the drill 112 are both powered at the same time. For example, the air valve 130 may require that the vacuum 104 is active while the pneumatic drill 112 is operational. The drill 112 is operational when there is power to the drill 112, such that pressing the trigger of the drill 112 would power rotation of the drill bit 110 (even if the drill 112 is not currently rotating the drill bit 110). The air valve 130 may require that the vacuum 104 is active while the pneumatic drill 112 is operational by ensuring that the drill 112 cannot receive compressed air through the hose 124 without the vacuum 104 also receiving compressed air through the second hose 128. Configuring the drill 112 and vacuum 104 in this way avoids the risk of a mechanic forgetting to turn on the vacuum 104 before drilling into the work piece through the jig 102. The pneumatic drill 112 and vacuum 104 may be particularly useful when drilling in sensitive environments, such as near fuel cells. In an alternative embodiment, the drill 112 and the vacuum 104 may be electrically-powered by a battery or electrical power circuit. Optionally, the debris containment system 100 may include a switch device electrically connected to the drill 112 that requires the vacuum 104 to be active in order for the drill 112 to be operational.

Figure 3:
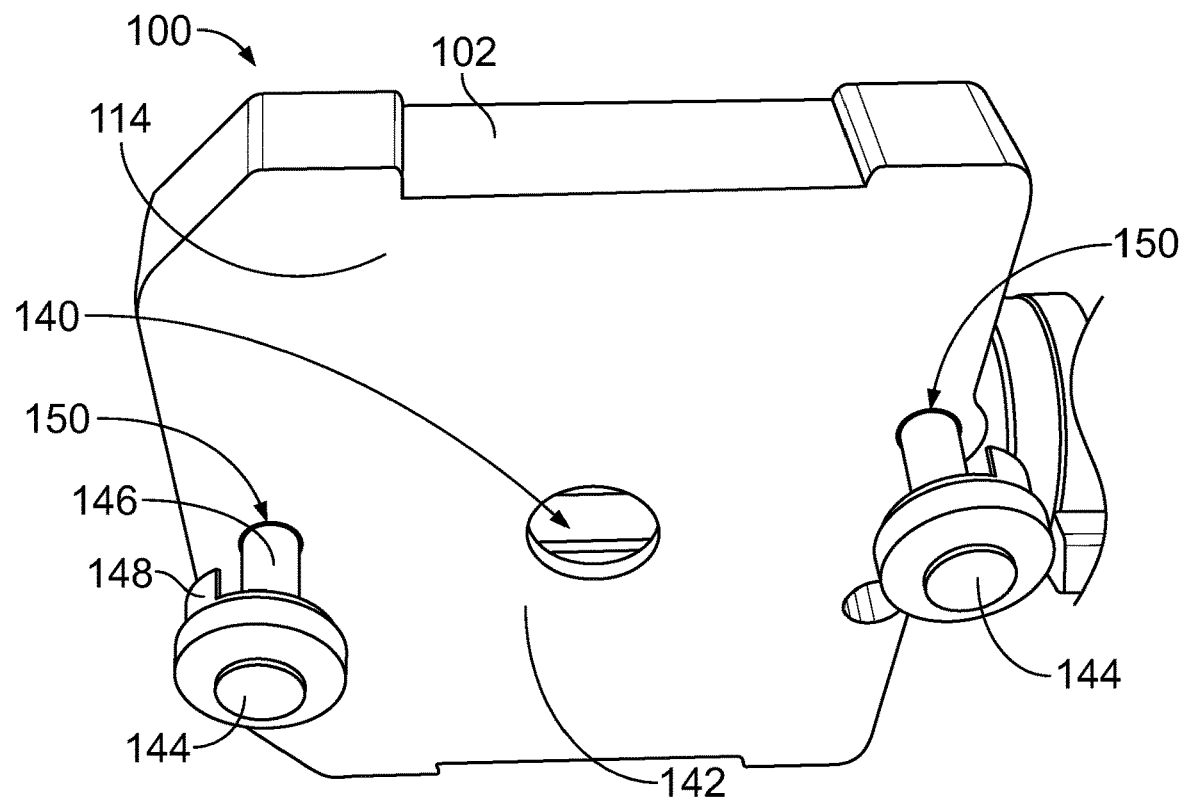
FIG. 3 illustrates a front of the jig of the debris collection assembly according to an embodiment.

FIG. 3 illustrates a front of the jig 102 of the debris collection assembly 100 according to an embodiment. The front wall 114 of the jig 102 defines an aperture 140 therethrough. Although not depicted in FIG. 3, the drill bit 110 (shown in FIG. 2) extends through the aperture 140 to drill the work piece. In an example, the aperture 140 is circular, but the aperture 140 may have a different shape in another embodiment, such as oval, rectangular, or the like. An exterior surface 142 of the front wall 114 may contact the work piece. In an example, the front wall 114 may be planar. Alternatively, the front wall 114 may have a non-planar shape. For example, the non-planar shape may be designed to conform to a curvature and/or angle of the work piece. For example, if the surface of the work piece to drill is concave, and the jig 102 may be designed with a convex front wall 114 to nest into the concave work piece.

The debris collection assembly 100 may include fasteners 144 that mount to the jig 102 and contact the work piece or another structure to secure the jig 102 in a fixed position relative to the work piece. The fasteners 144 extend from the front wall 114 in the illustrated embodiment. For example, the jig 102 may define mounting holes 150 along the front wall 114, and the fasteners 144 may be received into the mounting holes 150. The fasteners 144 in an embodiment may be bolts 146 with washers 148, as shown in more detail in FIG. 10. The mounting holes 150 may be threaded, and the bolts 146 may be threadably coupled to the mounting holes 150. Optionally, the mounting holes 150 may extend through a full thickness or depth of the jig 102, such that the mounting holes 150 penetrate the back wall 118 (as shown in FIG. 2). In other embodiments, the fasteners 144 used to secure the jig 102 in place may be pins, clamps, latches, suction cups, and/or the like.

Figure 4:
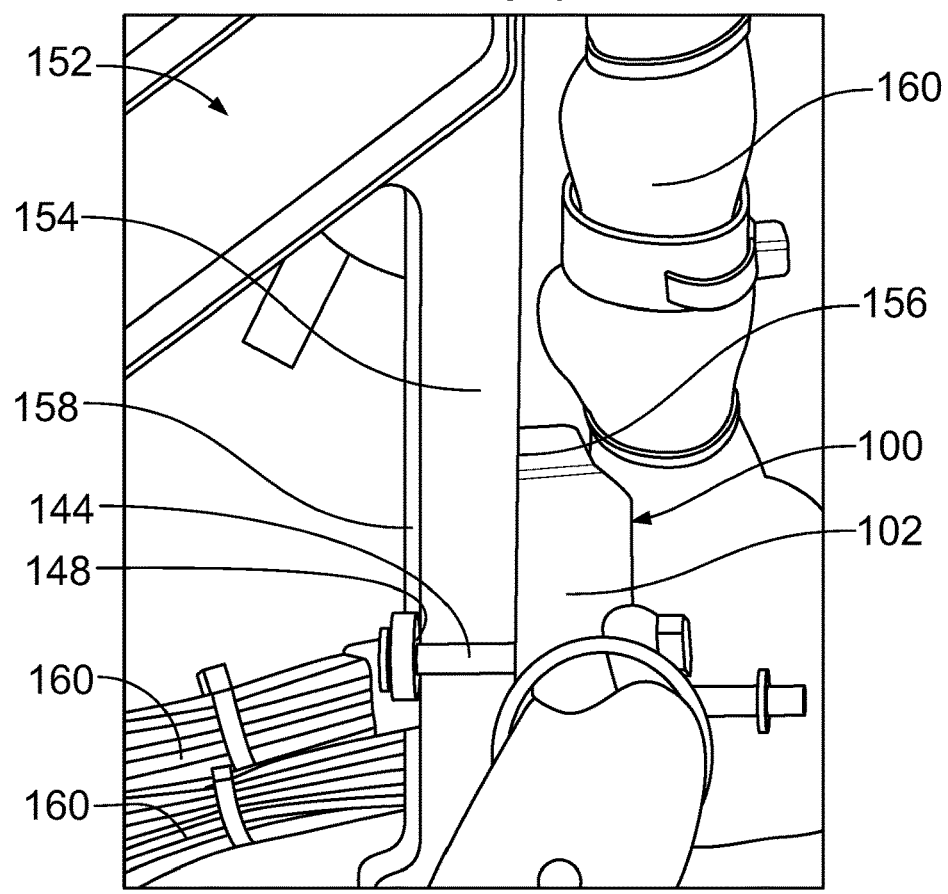
FIG. 4 is a side view showing the debris collection assembly installed in a working environment according to an example application.

FIG. 4 is a side view showing the debris collection assembly 100 installed in a working environment 152 according to an example application. The jig 102 is affixed to a work piece 154 via the fasteners 144. The work piece 154 in the illustrated embodiment is an upright frame member, or stanchion. The jig 102 may be pressed against a front side 156 of the stanchion 154 by the washers 148 of the fasteners 144 that engage a back side 158 of the stanchion 154. The jig 102 is secured in a fixed position, which allows a mechanic to quickly and easily drill into the front side 156 of the stanchion 154 without having to hold the jig 102 in place.

In an example application, the working environment 152 may be an area of an aircraft that is near sensitive and/or safety-critical components. For example, electrical wire harnesses 160 may be near the stanchion 154. The area may be a flight deck behind glass cockpit displays. The debris collection device 100 operates to capture and collect the debris generated by drilling to avoid the risk of metal chips or shavings electrically shorting two or more wires of the harnesses 160. Once the debris collection device 100 is installed, the drilling operation may be performed without the need for masking the surfaces in the environment 152 or fashioning a bag around the drilling location. The debris collection assembly 100 is not limited to use in sensitive and/or safety-critical areas, and is also not limited to use onboard aircraft. The debris collection assembly 100 may provide benefits in various different industries and applications. For example, carpenters and builders may use the debris collection assembly 100 in the construction of buildings. Automakers may use the debris collection assembly 100 to build new vehicles, and space companies may use the debris collection assembly 100 to build spacecraft.

Figure 5:
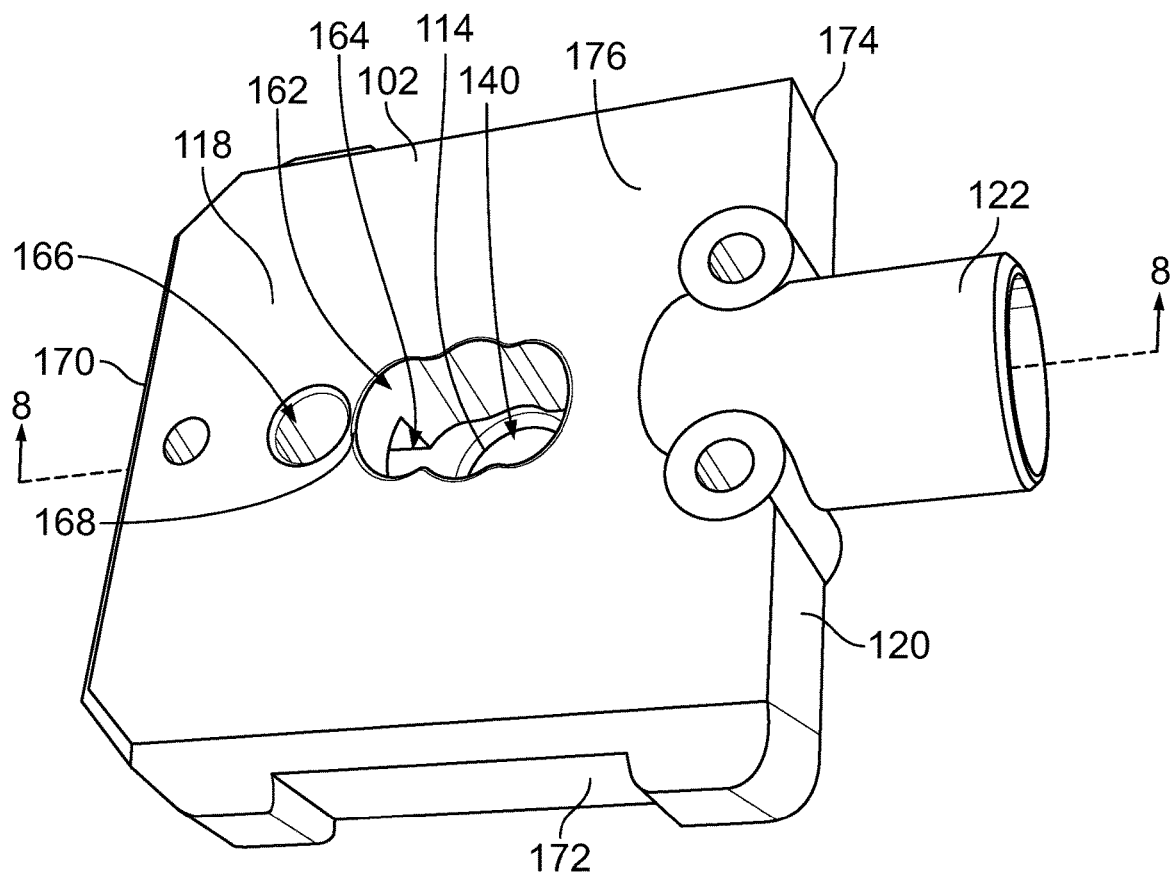
FIG. 5 is an isolated, isometric view of the jig according to an embodiment.

FIG. 5 is an isolated, isometric view of the jig 102 according to an embodiment. The back wall 118 of the jig 102 defines an adapter opening 162 therethrough. The adapter opening 162 aligns with the aperture 140 in the front wall 114. The aperture 114 may be smaller than the adapter opening 162. The adapter opening 162 is sized and shaped to accommodate the adapter insert 106 (shown in FIG. 1 and FIG. 6).

The jig 102 defines an interior cavity 164 that fluidly connects the aperture 140, the adapter opening 162, and the vacuum port 122. The interior cavity 164 is described in further detail with reference to FIG. 8. The jig 102 also defines an air inlet 166 through which ambient air from the environment may be drawn into the interior cavity 164. In an embodiment, the air inlet 166 is a discrete hole in the back wall 118. The adapter opening 162 is disposed between the air inlet 166 and the vacuum port 122. As such, the air that enters the air inlet 166 flows across the adapter insert 106 and drill bit 110 before exiting the jig 102 through the vacuum port 122. The air inlet 166 is separated from the adapter opening 162 by an intervening segment 168 of the back wall 118 in the illustrated embodiment. Alternatively, the intervening segment 168 may be omitted such that the air inlet 166 is an extension of the adapter opening 162.

In an example, the jig 102 may be box-shaped (e.g., a parallelepiped). The jig 102 may have four side walls extending from the front wall 114 to the back wall 118. The jig 102 has a depth (or thickness) that extends from the front wall 114 to the back wall 118. The jig 102 has a width extending from the first side wall 120 to a second side wall 170 opposite the first side wall 120. The jig 102 has a length (or height) extending from a third side wall 172 to a fourth side wall 174 opposite the third side wall 172. The jig 102 may have other shapes with different numbers of side wall in other embodiments. In an example, the jig 102 may be a cylindrical disc with a single curved side wall that continuously extends around the perimeter of the jig 102. Optionally, the jig 102 may have a non-regular shape that is based on the application. The shape may be designed to enable the jig 102 to quickly and easily align with the work piece when mounting the jig 102 relative to the work piece.

In an embodiment, the jig 102 has a unitary, one-piece body 176. In an embodiment, the body is additively manufactured. For example, the body 176 may be formed by sequentially depositing and fusing a source material layer by layer according to a digital build plan. Additive manufacturing may also be used to construct the adapter insert 106. A benefit of additive manufacturing is that the build plans for the jig and adapter insert may be electronically communicated to a customer with a license to enable the customer to build the parts with in-house additive manufacturing machines. This process may allow the customer to make the jig and adapter insert more quickly and economically than shipping physical parts through the mail. In another embodiment, the body 176 of the jig 102 may be formed by another manufacturing process, such as injection molding. The body 176 may be composed of a plastic material, a metal material, or the like.

Figures 6, 7:
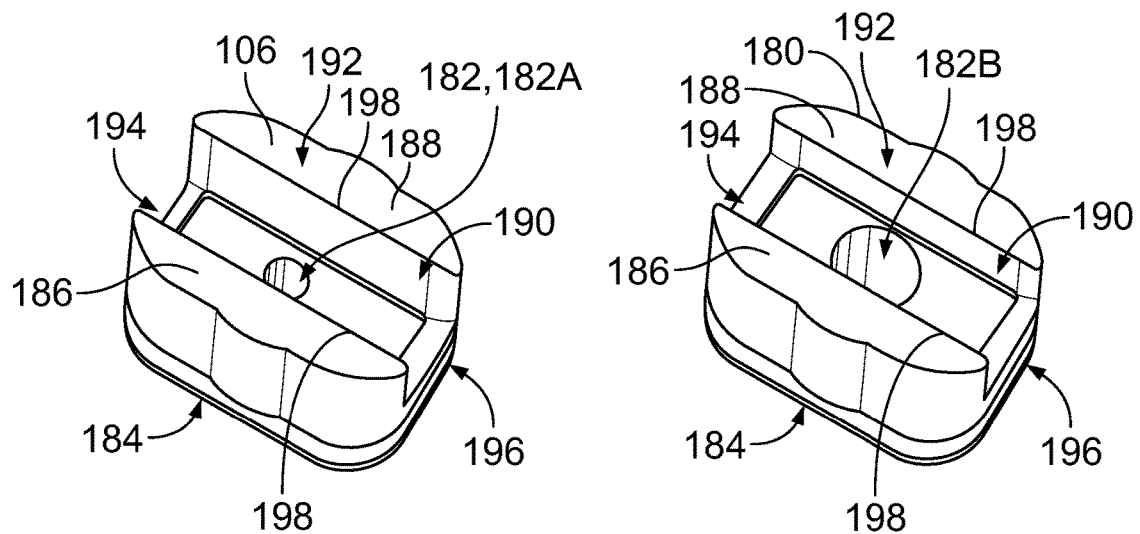
FIG. 6 is an isometric view of a first adapter insert of the debris collection assembly according to an embodiment.
FIG. 7 is an isometric view of a second adapter insert of the debris collection assembly according to an embodiment.

FIG. 6 is an isometric view of the adapter insert 106 according to an embodiment. The adapter insert 106 is removably loaded into the jig 102 through the adapter opening 162 shown in FIG. 5. A size and contour of the perimeter of the adapter insert 106 may generally match the size and contour of the adapter opening 162 to allow for a relatively tight fit. The adapter insert 106 is selectively replaceable within the jig 102. The adapter insert 106 represents a first adapter insert 106. FIG. 7 is an isometric view of a second adapter insert 180 of the debris collection assembly 100 according to an embodiment. A mechanic can insert the first adapter insert 106 into the jig 102 to perform a first drill operation, and then remove and replace the first adapter insert 106 with the second adapter insert 180 to perform a second drill operation. The jig 102 is secured in the fixed position during both drill operations, such that both drill operations are performed on the same location of the work piece 154. The first and second adapter inserts 106, 180 may have the same footprint. For example, a perimeter of the first adapter insert 106 may have the same size and contour as the perimeter of the second adapter insert 180.

Each adapter insert 106, 180 defines a respective orifice 182 therethrough. The orifice 182 is a hole or channel that extends through a thickness or depth of the adapter insert 106 from a respective proximal end 184 of the adapter insert 106, 180. The orifice 182A receives the drill bit 110 (shown in FIG. 2) therethrough. The orifice 182B of the second adapter insert 180 is larger than the orifice 182A of the first adapter insert 106. For example, the orifice 182B of the second adapter insert 180 may accommodate and hold a drill bit or other drill attachment with a larger diameter than the drill bit 110 held by the first adapter insert 106.

Each adapter insert 106, 180 includes a first wall 186 and a second wall 188 that are spaced apart on opposite sides of the orifice 182. The first and second walls 186, 188 are parallel and define a trough 190 therebetween. The trough 190 is an elongated channel or trench that is open at a distal end 192 of the adapter insert 106, opposite the proximal end 184. The trough 190 is open along both first and second lateral ends 194, 196 of the respective adapter insert 106, 180. When one of the adapter inserts 106, 180 is loaded into the jig 102, the respective trough 190 defines a portion of an air pathway through the interior cavity 164 of the jig 102. The orifice 182 may be located at a lateral center of the trough 190, such that the corresponding drill bit project through the lateral center of the trough 190.

In an embodiment, the width of the trough 190 between the two walls 186, 188 of each adapter insert 106, 180 may be narrower than a diameter of the aperture 140 in the front wall 114. As such, a portion of distal edges 198 of the first and second walls 186, 188 may be exposed to the debris through the aperture 140. Some solid pieces of debris (e.g., chips or shavings) may contact the distal edges 198 of the walls 186, 188 when sucked into the aperture 140 by the high velocity airflow. The distal edges 198 may break up large pieces of debris into smaller pieces. The smaller pieces enter the trough 190 and are sucked out of the jig 102 through the vacuum port 122.

Figure 8:
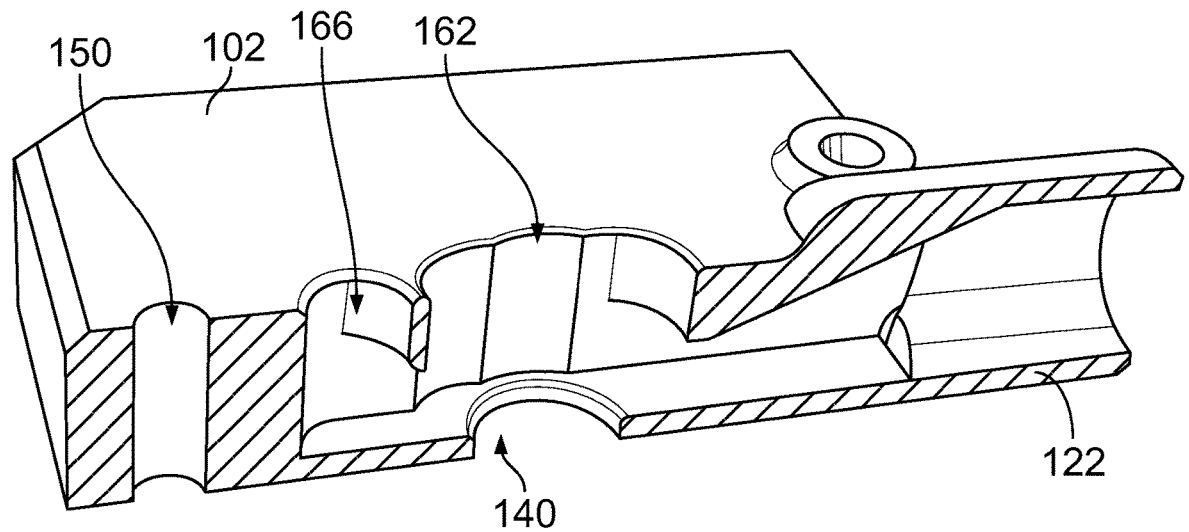
FIG. 8 is a cross-sectional view of the jig shown in FIG. 5.

FIG. 8 is a cross-sectional view of the jig 102 shown in FIG. 5. The cross-section is taken along line 8-8 in FIG. 5. In the illustrated embodiment, the cross-section line intersects a mounting hole 150, the air inlet 166, the adapter opening 162, the aperture 140, and the vacuum port 122. As shown in FIG. 8, the adapter opening 162 aligns with the aperture 140. The adapter opening 162 may have a greater size (e.g., area) than the aperture 140. The interior cavity 164 within the jig 102 fluidly connects the air inlet 166, the adapter opening 162, the aperture 140, and the vacuum port 122. For example, the interior cavity 164 defines an air pathway that extends from the air inlet 166 across both the adapter opening 162 and the aperture 140 to the vacuum port 122.

Figure 9:
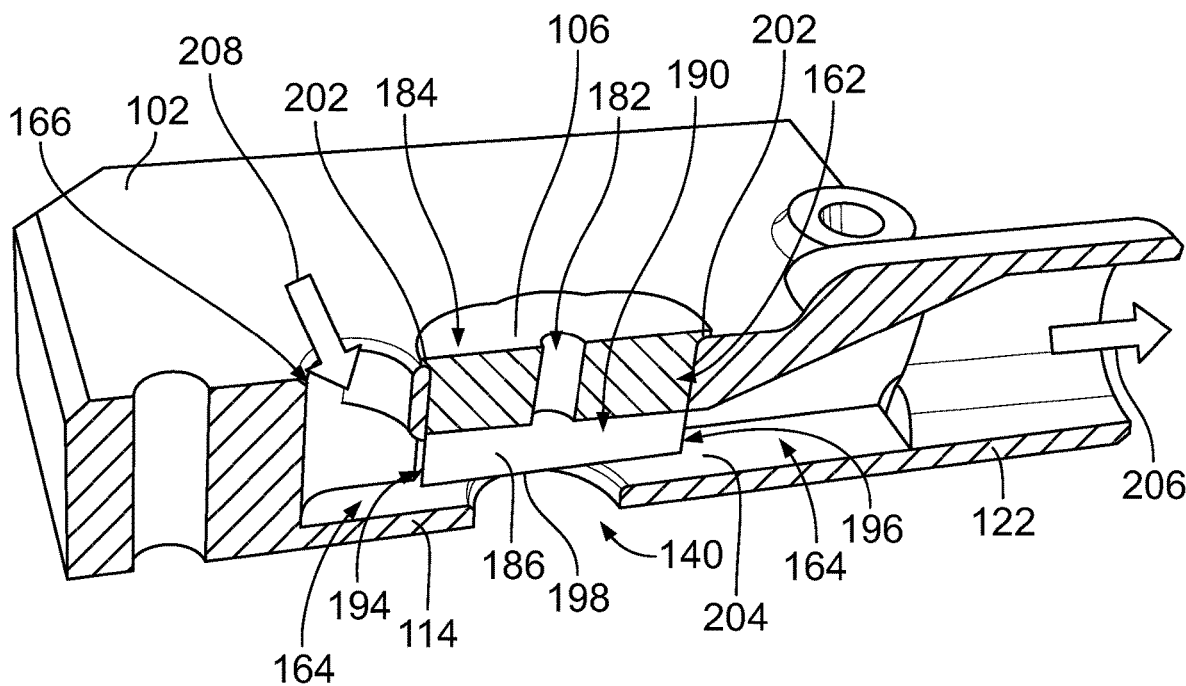
FIG. 9 is a cross-sectional view of the jig and the first adapter insert taken along line 8-8 in FIG. 5.

FIG. 9 is a cross-sectional view of the jig 102 and the adapter insert 106 taken along line 8-8 in FIG. 5. The adapter insert 106 is loaded into the jig 102 through the adapter opening 162. The adapter insert 106 may include a flange 202 at the proximal end 184 to assist with handling the adapter insert 106 and extracting the adapter insert 106 from the jig 102. As shown in FIG. 9, the orifice 182 of the adapter insert 106 extends from the proximal end 184 to the trough 190. Only the first wall 186 of the two walls 186, 188 of the adapter insert 106 are visible in FIG. 9 due to the cross-section. Optionally, the distal end or edge 198 of the wall 186 may abut against an interior surface 204 of the front wall 114 when the adapter insert 106 is fully loaded in the jig 102. As shown in FIG. 9, a portion of the distal edge 198 may overlap and extend across the aperture 140. That portion of the wall 186 may break up chips and/or shavings of debris into smaller pieces. The trough 190 is fluidly connected to the vacuum port 122 and defines a portion of the air pathway through the interior cavity 164.

When the vacuum 104 (shown in FIG. 1) is operating, the vacuum 104 applies a negative pressure (e.g., suction) at the vacuum port 122 in outgoing direction 206 towards the vacuum 104. The negative pressure draws air from outside of the jig 102 in an incoming direction 208 into the air inlet 166 and through the interior cavity 164. The air stream may have a relatively high velocity. The air stream may flow through the trough 190 from the first lateral end 194 to the second lateral end 196 and pass around the spinning drill bit 110 (shown in FIG. 2). The air stream through the trough 190 captures debris generated from the drilling. The spinning drill bit 110 may itself increase the suction on the debris in the area right around the drill bit 110. The debris that enters the trough 190 through the aperture 140 is blown through the interior cavity 164 to the vacuum port 122 and exits the jig 102 into the vacuum tube 108 (shown in FIG. 1).

Figure 10:
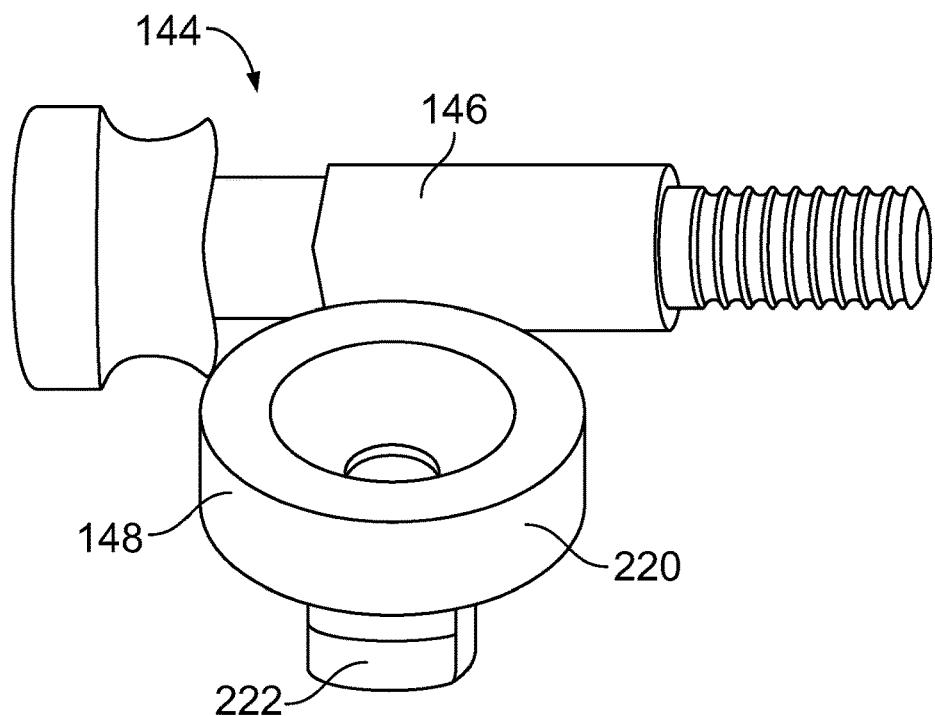
FIG. 10 illustrates one fastener of the debris collection assembly according to an embodiment.

FIG. 10 illustrates one of the fasteners 144 of the debris collection assembly 100 according to an embodiment. The fastener 144 includes the bolt 146 and the washer 148. The bolt 146 may threadably couple to one of the mounting holes 150 of the jig 102, as shown in FIG. 3. The washer 148 has an annular body 220 and a tab 222 that projects from the annular body 220. The tab 222 may contact the work piece 154 or another structure to secure the jig 102 in place relative to the work piece 154.

Figure 11:
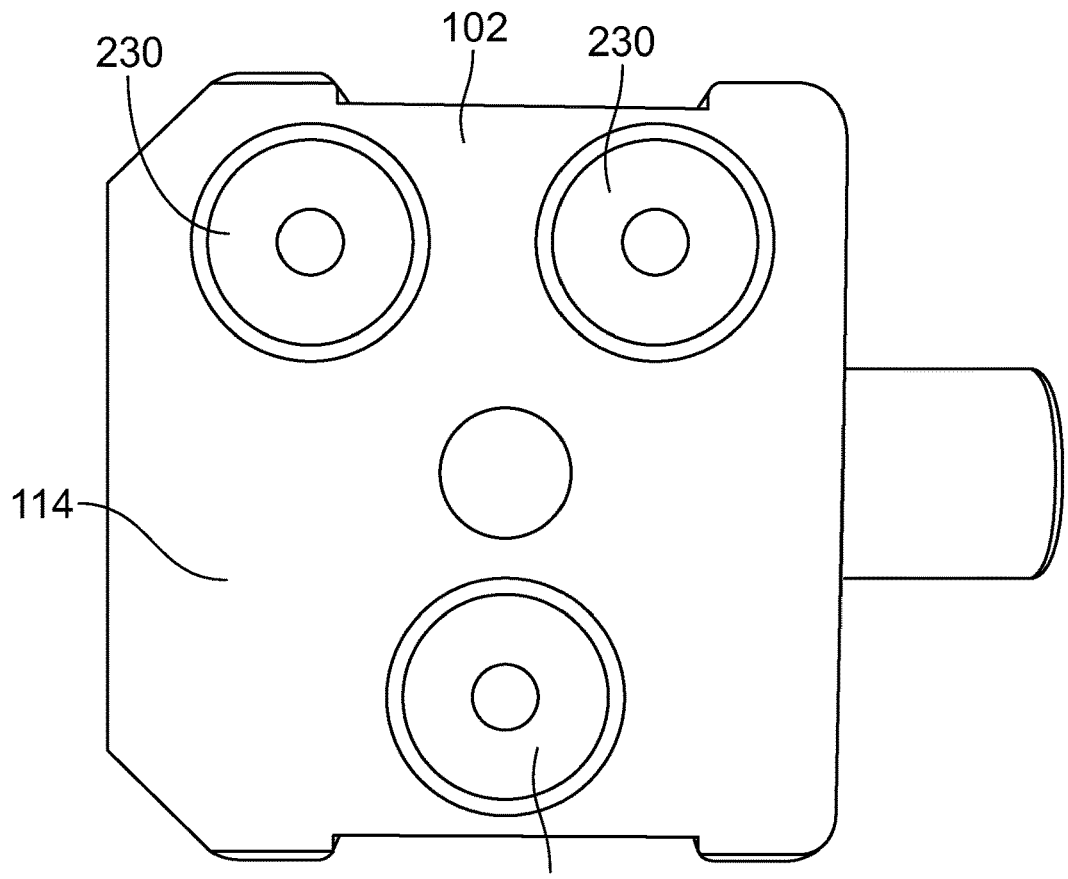
FIG. 11 is a plan view of the front of the jig according to an alternative embodiment.

FIG. 11 is a plan view of the front of the jig 102 according to an alternative embodiment. In the illustrated embodiment, the jig 102 includes multiple suction cups 230 mounted to the front wall 114 of the jig 102. The suction cups 230 may releasably secure the jig 102 to the work piece 154. The suction cups 230 may replace the fasteners 144. For example, the jig 102 in this alternative embodiment may lack mounting holes for receiving fasteners. The jig 102 may include one, two, four, or more suction cups 230, rather than three, in other embodiments. In another alternative embodiment, clamps may be used to secure the jig 102 in a fixed position relative to the work piece 154.

Figure 12:
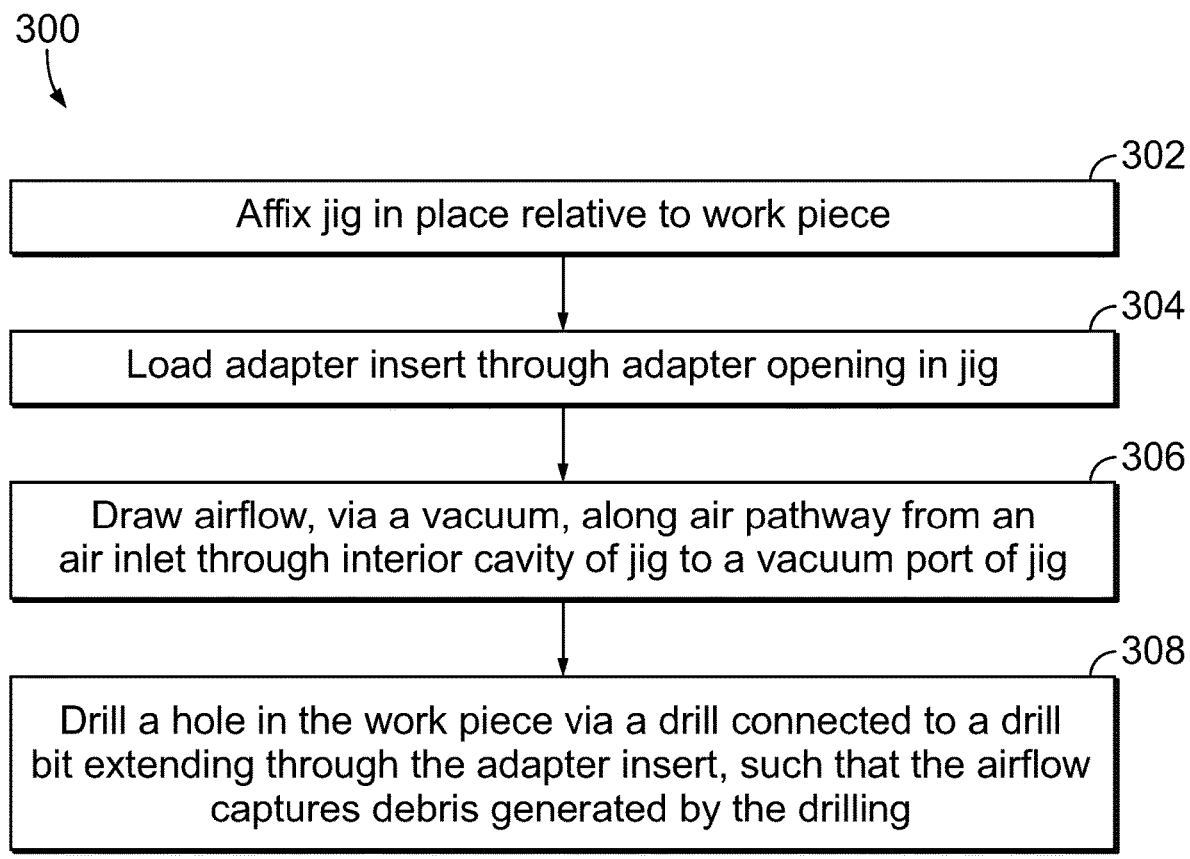
FIG. 12 is a flow chart of a method of drilling a work piece to collect and contain debris according to an embodiment.

FIG. 12 is a flow chart 300 of a method of drilling a work piece to collect and contain debris according to an embodiment. The method optionally may include at least one additional step than shown, at least one fewer step than shown, and/or at least one different step than shown in FIG. 12. At step 302, a jig 102 is affixed in place relative to a work piece 154. The jig 102 includes a front wall 114 and a back wall 118 opposite the front wall 114. The front wall 114 defines an aperture 140 therethrough. The back wall 118 defines an adapter opening 162 that aligns with the aperture 140 in the front wall 114. The jig 102 includes a vacuum port 122 and defines an interior cavity 164 that fluidly connects the aperture 140, the adapter opening 162, and the vacuum port 122. In an embodiment, affixing the jig 102 in place relative to the work piece 154 may include attaching fasteners 144 to mounting holes 150 in the jig 102 and securing the fasteners 144 to the work piece 154 or another structure.

At step 304, an adapter insert 106 is loaded through the adapter opening 162 into the interior cavity 164 of the jig 102. The adapter insert 106 defines an orifice 182A therethrough that is sized to receive a drill bit 110. At step 306, airflow is drawn, via a vacuum 104 coupled to the vacuum port 122, along an air pathway that extends from an air inlet 166 of the jig 102 through the interior cavity 164 to the vacuum port 122. At step 308, a hole in the work piece 154 is drilled via a drill 112 connected to the drill bit 110 that extends through the orifice 182 of the adapter insert 106. The vacuum 104 draws the airflow to capture debris generated from the drilling.

In an embodiment, the adapter insert 106 is a first adapter insert, the drill bit 110 is a first drill bit, and the hole that is drilled in the work piece 154 is a first hole. The method optionally may include withdrawing the first adapter insert 106 and the first drill bit 110 from the jig 102, and thereafter loading a second adapter insert 180 through the adapter opening 162 into the interior cavity 164 of the jig 102. The second adapter insert 180 may have the same footprint as the first adapter insert 106. The second adapter insert 180 may define a second orifice 182B therethrough that is sized to receive a second drill bit. The second orifice 182B and the second drill bit may be larger than the orifice 182A of the first adapter insert 106 and the first drill bit 110, respectively. The method may include drilling a second hole in the work piece 154 via the drill 112 connected to the second drill bit. For example, the first hole may be a pilot hole, and the second hole may be a full-size hole that enlarges the pilot hole.

Optionally, the method may include withdrawing the (first) adapter insert 106 and the drill bit 110 from the jig 102, and thereafter inserting a wire brush attachment into the interior cavity 164 of the jig 102 through the adapter opening 162. A brush end of the wire brush attachment may extend through the aperture 140 in the front wall 114. The method may include rotating the wire brush attachment via the drill 112 or a second drill to sand the work piece 154. For example, the brush end may remove one or more layers of material from the surface of the work piece 154 via abrasion.

In an embodiment, both the drill 112 and the vacuum 104 are powered by compressed air. The method may include supplying compressed air to both the vacuum 104 and the drill 112 from a common compressed air source 126 via an air valve 130.

Figure 13:
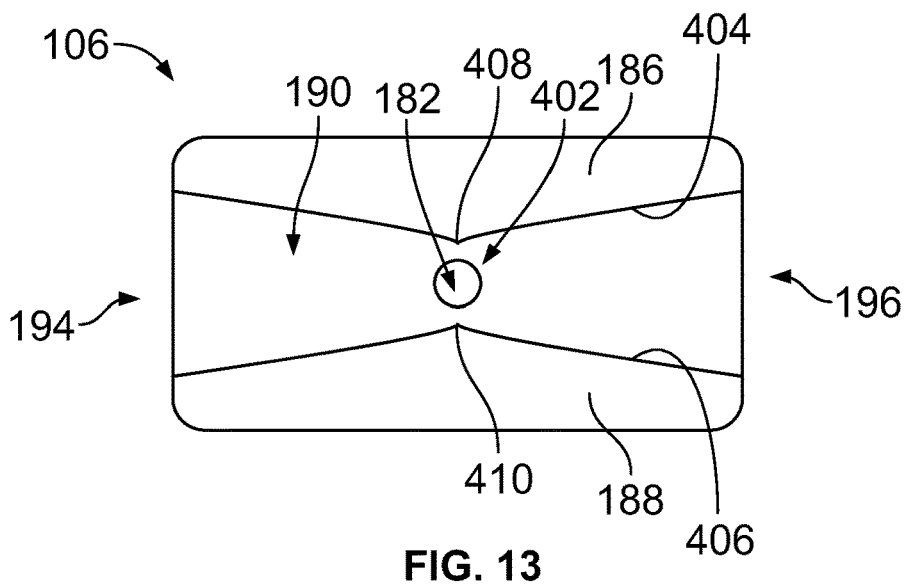
FIG. 13 is a bottom view of the first adapter insert of the debris collection assembly according to a second embodiment.
Figure 14:
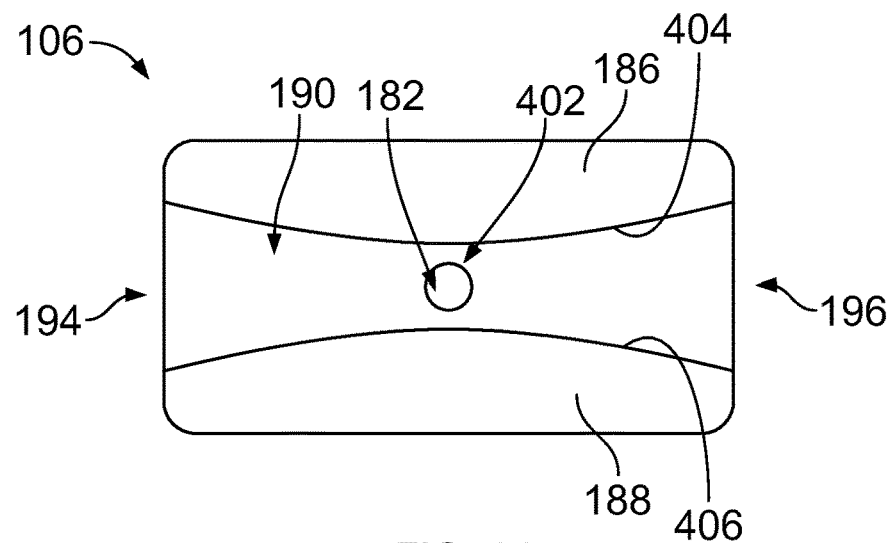
FIG. 14 is a bottom view of the first adapter insert according to a third embodiment.

FIG. 13 is a bottom view of the adapter insert 106 of the debris collection assembly according to a second embodiment. FIG. 14 is a bottom view of the first adapter insert 106 according to a third embodiment. In each of FIGS. 13 and 14, the trough 190 has a non-uniform width between the first and second walls 186, 188 along a length of the adapter insert 106 from the first lateral end 194 to the second lateral end 196. For example, the trough 190 in each embodiment has a narrow or constricted portion 402 midway between the two lateral ends 194, 196. The narrow portion 402 is at the location of the orifice 182 that receives the drill bit. This narrow portion 402 serves as a restriction that increases the air speed through the trough 190 and reduces pressure in the trough 190 via Bernoulli's principle. The tight spacing between the walls 186, 188 also act as a chip breaker to break up relatively large pieces of debris.

The trough 190 is defined between an inner surface 404 of the first wall 186 and an inner surface 406 of the second wall 188. The inner surfaces 404, 406 face each other across the trough 190. In FIG. 13, an inner surfaces 404, 406 are each angled to define a respective peak 408, 410 at the location of the orifice 182. The smallest width of the narrow portion 402 is between the two peaks 408, 410. In FIG. 14, the inner surfaces 404, 406 are curved rather than angled. For example, both the inner surfaces 404, 406 have convex curves that bow towards each other and are closest to each other at the location of the orifice 182.

Figure 15:
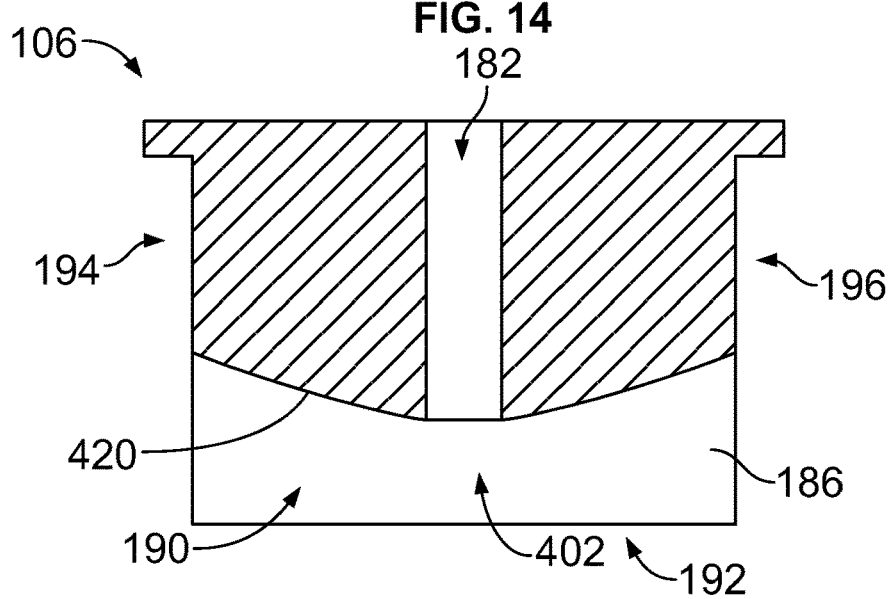
FIG. 15 is a side cross-sectional view of the first adapter insert according to at least one of the second embodiment or the third embodiment.

FIG. 15 is a side cross-sectional view of the first adapter insert 106 according to at least one of the second embodiment or the third embodiment. As compared to the cross-sectional view of the first adapter insert 106 shown in FIG. 9, the first adapter insert 106 in FIG. 15 has a non-linear depth of the trough 190 from the distal end 192 of the adapter insert 106 to a ceiling 420 of the trough 190. For example, the ceiling 420 has a convex curve that boxes toward the distal end 192. The trough 190 is shallowest at the narrow portion 402 midway between the lateral ends 194, 196, which aligns with the orifice 182. The shallow depth of the trough 190 at the narrow portion 402 contributes to the increased air speed and reduced pressure at the location of the drill bit via Bernoulli's principle. Either or both of the embodiments shown in FIGS. 13 and 14 may have a side cross-section as shown in FIG. 15.

Clause 1. A debris collection assembly comprising:
a jig including a front wall and a back wall opposite the front wall, the front wall defining an aperture therethrough, the back wall defining an adapter opening that aligns with the aperture in the front wall, wherein the jig includes a vacuum port configured to attach to a vacuum tube, the jig defining an interior cavity that fluidly connects the aperture, the adapter opening, and the vacuum port; and
an adapter insert removably loaded through the adapter opening into the interior cavity, the adapter insert defining an orifice therethrough that is sized to receive a drill bit and allow the drill bit to extend through the aperture in the front wall to drill into a work piece, wherein negative pressure at the vacuum port draws airflow through the interior cavity and captures debris generated from drilling.

Clause 2. The debris collection assembly of clause 1, wherein the adapter insert includes a first wall and a second wall that are spaced apart on opposite sides of the orifice and define a trough therebetween at a distal end of the adapter insert.

Clause 3. The debris collection assembly of clause 2, wherein the trough is fluidly connected to the vacuum tube and defines a portion of an air pathway that extends from an air inlet of the jig to the vacuum port.

Clause 4. The debris collection assembly of clause 2, wherein the trough is narrower than a diameter of the aperture and distal edges of the first and second walls of the adapter insert are configured to break up debris received through the aperture.

Clause 5. The debris collection assembly of any of clauses 1-4, wherein the adapter insert is a first adapter insert, and the debris collection assembly comprises a second adapter insert, the second adapter insert having a same footprint as the first adapter insert and defining a second orifice therethrough that is larger than the orifice in the first adapter insert, the second adapter insert configured to removably replace the first adapter insert in the adapter opening of the jig.

Clause 6. The debris collection assembly of any of clauses 1-5, further comprising the vacuum tube attached to the vacuum port of the jig and a vacuum that includes or is connected to the vacuum tube, wherein the vacuum is operated to draw the airflow along an air pathway that extends from an air inlet of the jig through the interior cavity to the vacuum port.

Clause 7. The debris collection assembly of clause 6, further comprising:
a pneumatic drill disposed beyond the back wall of the jig and secured to the drill bit to drill into the work piece; and
an air valve connected to both the pneumatic drill and the vacuum to supply compressed air to both the pneumatic drill and the vacuum.

Clause 8. The debris collection assembly of clause 7, wherein the air valve requires that the vacuum be active while the pneumatic drill is operational.

Clause 9. The debris collection assembly of any of clauses 1-8, wherein the jig include at least a first side wall that extends from the front wall to the back wall, and the vacuum port extends from the first side wall.

Clause 10. The debris collection assembly of clause 9, wherein the jig is box-shaped and the first side wall is one of four side walls extending from the front wall to the back wall.

Clause 11. The debris collection assembly of clause 10, wherein a depth of the jig from the front wall to the back wall is less than a length of the jig and a width of the jig, the length and width perpendicular to the depth.

Clause 12. The debris collection assembly of any of clauses 1-11, wherein the jig defines mounting holes extending into the front wall, and the debris collection assembly comprises multiple fasteners inserted into the mounting holes and configured to contact the work piece or another structure to secure the jig in a fixed position relative to the work piece.

Clause 13. The debris collection assembly of clause 12, wherein the mounting holes are threaded and the fasteners include bolts that are threadably coupled to the mounting holes, the fasteners including washers on the bolts, each of the washers having an annular body and a tab that projects from the annular body to contact the work piece or another structure.

Clause 14. A method of drilling a work piece to collect debris, the method comprising:
affixing a jig in place relative to a work piece, the jig including a front wall and a back wall opposite the front wall, the front wall defining an aperture therethrough, the back wall defining an adapter opening that aligns with the aperture in the front wall, wherein the jig includes a vacuum port and defines an interior cavity that fluidly connects the aperture, the adapter opening, and the vacuum port;
loading an adapter insert through the adapter opening into the interior cavity of the jig, the adapter insert defining an orifice therethrough that is sized to receive a drill bit;
drawing airflow, via a vacuum coupled to the vacuum port of the jig, along an air pathway that extends from an air inlet of the jig through the interior cavity to the vacuum port; and
drilling a hole in the work piece via a drill connected to the drill bit, wherein the vacuum draws the airflow to capture debris generated from the drilling.

Clause 15. The method of clause 14, wherein the adapter insert is a first adapter insert, the drill bit is a first drill bit, and the hole that is drilled in the work piece is a first hole, the method further comprising:
withdrawing the first adapter insert and the first drill bit from the jig; and
loading a second adapter insert through the adapter opening into the interior cavity of the jig, the second adapter insert having a same footprint as the first adapter insert.

Clause 16. The method of clause 15, wherein the second adapter insert defines a second orifice therethrough that is sized to receive a second drill bit, wherein the second orifice and the second drill bit are larger than the first orifice and the first drill bit, respectively, and the method includes drilling a second hole in the work piece via the drill connected to the second drill bit.

Clause 17. The method of any of clauses 14-16, further comprising:
withdrawing the adapter insert and the drill bit from the jig;
inserting a wire brush attachment into the interior cavity of the jig through the adapter opening such that a brush end of the wire brush attachment extends through the aperture in the front wall; and
rotating the wire brush attachment via the drill or a second drill to sand the work piece.

Clause 18. The method of any of clauses 14-17, wherein both the drill and the vacuum are powered by compressed air, and the method comprises supplying compressed air to both the vacuum and the drill from a common compressed air source via an air valve.

Clause 19. The method of any of clauses 14-18, wherein affixing the jig in place relative to the work piece includes attaching fasteners to mounting holes in the jig and securing the fasteners to the work piece or another structure.

Clause 20. A debris collection assembly comprising:
a jig including a front wall, a back wall, and at least a first side wall extending from the front wall to the back wall, the front wall defining an aperture therethrough, the first side wall including a vacuum port configured to attach to a vacuum tube, the back wall defining an adapter opening that aligns with the aperture in the front wall, the jig defining an interior cavity that fluidly connects the aperture, the adapter opening, and the vacuum port;

a vacuum coupled to the vacuum port of the jig via a tube, the vacuum configured to draw airflow along an air pathway that extends from an air inlet of the jig through the interior cavity to the vacuum port; and an adapter insert removably loaded through the adapter opening into the interior cavity of the jig, the adapter insert defining an orifice therethrough that is sized to receive a drill bit and allow the drill bit to extend through the aperture in the front wall to drill into a work piece, wherein the vacuum draws the airflow to capture debris, generated from drilling, into the interior cavity of the jig and collect the debris in a receptacle of the vacuum.

While various spatial and direction terms such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A debris collection assembly comprising:
a jig including a front wall and a back wall opposite the front wall, the front wall defining an aperture therethrough, the back wall defining an adapter opening that aligns with the aperture in the front wall, wherein the jig includes a vacuum port configured to attach to a vacuum tube, the jig defining an interior cavity that fluidly connects the aperture, the adapter opening, and the vacuum port, wherein the jig defines mounting holes extending into the front wall;
fasteners inserted into the mounting holes and configured to contact a work piece or another structure to secure the jig in a fixed position relative to the work piece; and
an adapter insert removably loaded through the adapter opening into the interior cavity, the adapter insert defining an orifice therethrough that is sized to receive a drill bit and allow the drill bit to extend through the aperture in the front wall to drill into the work piece, wherein negative pressure at the vacuum port draws airflow through the interior cavity and captures debris generated from drilling.

2. The debris collection assembly of claim 1, wherein the adapter insert includes a first wall and a second wall that are spaced apart on opposite sides of the orifice and define a trough therebetween at a distal end of the adapter insert.

3. The debris collection assembly of claim 2, wherein the trough is fluidly connected to the vacuum tube and defines a portion of an air pathway that extends from an air inlet of the jig to the vacuum port.

4. The debris collection assembly of claim 2, wherein the trough is narrower than a diameter of the aperture and distal edges of the first and second walls of the adapter insert are configured to break up debris received through the aperture.

5. The debris collection assembly of claim 1, wherein the adapter insert is a first adapter insert, and the debris collection assembly comprises a second adapter insert, the second adapter insert having a same footprint as the first adapter insert and defining a second orifice therethrough that is larger than the orifice in the first adapter insert, the second adapter insert configured to removably replace the first adapter insert in the adapter opening of the jig.

6. The debris collection assembly of claim 1, further comprising the vacuum tube attached to the vacuum port of the jig and a vacuum that includes or is connected to the vacuum tube, wherein the vacuum is operated to draw the airflow along an air pathway that extends from an air inlet of the jig through the interior cavity to the vacuum port.

7. The debris collection assembly of claim 6, further comprising:
a pneumatic drill disposed beyond the back wall of the jig and secured to the drill bit to drill into the work piece; and
an air valve connected to both the pneumatic drill and the vacuum to supply compressed air to both the pneumatic drill and the vacuum.

8. The debris collection assembly of claim 7, wherein the air valve requires that the vacuum be active while the pneumatic drill is operational.

9. The debris collection assembly of claim 1, wherein the jig include at least a first side wall that extends from the front wall to the back wall, and the vacuum port extends from the first side wall.

10. The debris collection assembly of claim 9, wherein the jig is box-shaped and the first side wall is one of four side walls extending from the front wall to the back wall.

11. The debris collection assembly of claim 10, wherein a depth of the jig from the front wall to the back wall is less than a length of the jig and a width of the jig, the length and width perpendicular to the depth.

12. The debris collection assembly of claim 1, wherein the mounting holes are threaded and the fasteners include bolts that are threadably coupled to the mounting holes, the fasteners including washers on the bolts, each of the washers having an annular body and a tab that projects from the annular body to contact the work piece or another structure.

13. A method of drilling a work piece to collect debris, the method comprising:
affixing a jig in place relative to a work piece, the jig including a front wall and a back wall opposite the front wall, the front wall defining an aperture therethrough, the back wall defining an adapter opening that aligns with the aperture in the front wall, wherein the jig includes a vacuum port and defines an interior cavity that fluidly connects the aperture, the adapter opening, and the vacuum port, wherein affixing the jig in place relative to the work piece includes attaching fasteners to mounting holes in the jig and securing the fasteners to the work piece or another structure;
loading an adapter insert through the adapter opening into the interior cavity of the jig, the adapter insert defining an orifice therethrough that is sized to receive a drill bit;
drawing airflow, via a vacuum coupled to the vacuum port of the jig, along an air pathway that extends from an air inlet of the jig through the interior cavity to the vacuum port; and
drilling a hole in the work piece via a drill connected to the drill bit, wherein the vacuum draws the airflow to capture debris generated from the drilling.

14. The method of claim 13, wherein the adapter insert is a first adapter insert, the drill bit is a first drill bit, and the hole that is drilled in the work piece is a first hole, the method further comprising:
withdrawing the first adapter insert and the first drill bit from the jig; and
loading a second adapter insert through the adapter opening into the interior cavity of the jig, the second adapter insert having a same footprint as the first adapter insert.

15. The method of claim 14, wherein the second adapter insert defines a second orifice therethrough that is sized to receive a second drill bit, wherein the second orifice and the second drill bit are larger than the first orifice and the first drill bit, respectively, and the method includes drilling a second hole in the work piece via the drill connected to the second drill bit.

16. The method of claim 13, further comprising:
withdrawing the adapter insert and the drill bit from the jig;
inserting a wire brush attachment into the interior cavity of the jig through the adapter opening such that a brush end of the wire brush attachment extends through the aperture in the front wall; and
rotating the wire brush attachment via the drill or a second drill to sand the work piece.

17. The method of claim 13, wherein both the drill and the vacuum are powered by compressed air, and the method comprises supplying compressed air to both the vacuum and the drill from a common compressed air source via an air valve.

18. A debris collection assembly comprising:
a jig including a front wall, a back wall, and at least a first side wall extending from the front wall to the back wall, the front wall defining an aperture therethrough, the first side wall including a vacuum port configured to attach to a vacuum tube, the back wall defining an adapter opening that aligns with the aperture in the front wall, the jig defining an interior cavity that fluidly connects the aperture, the adapter opening, and the vacuum port, wherein the jig defines mounting holes extending into the front wall;
fasteners inserted into the mounting holes and configured to contact a work piece or another structure to secure the jig in a fixed position relative to the work piece;
a vacuum coupled to the vacuum port of the jig via a tube, the vacuum configured to draw airflow along an air pathway that extends from an air inlet of the jig through the interior cavity to the vacuum port; and
an adapter insert removably loaded through the adapter opening into the interior cavity of the jig, the adapter insert defining an orifice therethrough that is sized to receive a drill bit and allow the drill bit to extend through the aperture in the front wall to drill into the work piece,
wherein the vacuum draws the airflow to capture debris, generated from drilling, into the interior cavity of the jig and collect the debris in a receptacle of the vacuum.

19. The debris collection system of claim 18, wherein the mounting holes are threaded and the fasteners include bolts that are threadably coupled to the mounting holes, the fasteners including washers on the bolts, each of the washers having an annular body and a tab that projects from the annular body to contact the work piece or another structure.

20. A method of drilling a work piece to collect debris, the method comprising:
affixing a jig in place relative to a work piece, the jig including a front wall and a back wall opposite the front wall, the front wall defining an aperture therethrough, the back wall defining an adapter opening that aligns with the aperture in the front wall, wherein the jig includes a vacuum port and defines an interior cavity that fluidly connects the aperture, the adapter opening, and the vacuum port;
loading an adapter insert through the adapter opening into the interior cavity of the jig, the adapter insert defining an orifice therethrough that is sized to receive a drill bit;
drawing airflow, via a vacuum coupled to the vacuum port of the jig, along an air pathway that extends from an air inlet of the jig through the interior cavity to the vacuum port;
drilling a hole in the work piece via a drill connected to the drill bit, wherein the vacuum draws the airflow to capture debris generated from the drilling;
withdrawing the adapter insert and the drill bit from the jig;
inserting a wire brush attachment into the interior cavity of the jig through the adapter opening such that a brush end of the wire brush attachment extends through the aperture in the front wall; and
rotating the wire brush attachment via the drill or a second drill to sand the work piece.

* * * * *